United States Patent
Emeott et al.

(10) Patent No.: US 9,693,030 B2
(45) Date of Patent: Jun. 27, 2017

(54) GENERATING ALERTS BASED UPON DETECTOR OUTPUTS

(71) Applicant: General Instrument Corporation, Horsham, PA (US)

(72) Inventors: Stephen P. Emeott, Rolling Meadows, IL (US); Kevin L. Baum, Rolling Meadows, IL (US); Bhavan Gandhi, Vernon Hills, IL (US); Faisal Ishtiaq, Chicago, IL (US); Isselmou Ould Dellahy, Lake in the Hills, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 14/444,934

(22) Filed: Jul. 28, 2014

(65) Prior Publication Data

US 2015/0070587 A1    Mar. 12, 2015

Related U.S. Application Data

(60) Provisional application No. 61/875,683, filed on Sep. 9, 2013.

(51) Int. Cl.
*H04N 7/173* (2011.01)
*H04N 9/74* (2006.01)
(Continued)

(52) U.S. Cl.
CPC .......... *H04N 9/74* (2013.01); *G06K 9/00711* (2013.01); *G06K 9/18* (2013.01); *G06K 9/3266* (2013.01);
(Continued)

(58) Field of Classification Search
None
See application file for complete search history.

(56) References Cited

U.S. PATENT DOCUMENTS 5,614,940 A    3/1997   Cobbley et al.
5,703,655 A   12/1997   Corey et al.
(Continued)

FOREIGN PATENT DOCUMENTS

| WO | 02080546 A1 | 10/2002 |
| WO | 03/051031 A2 | 6/2003 |
| WO | 2012/027594 A2 | 3/2012 |

OTHER PUBLICATIONS

Boril, Sangwan, Hasan, and Hansen, "Automatic Excitement-Level Detection for Sports Highlights Generation", Interspeech 2010, University of Texas at Dallas, Sep. 26-30, 2010, pp. 2202-2205.
(Continued)

*Primary Examiner* — Fernando Alcon
(74) *Attorney, Agent, or Firm* — Stewart M. Wiener

(57) ABSTRACT

Systems and methods for generating alerts and enhanced viewing experience features using on-screen data are disclosed. Textual data corresponding to on-screen text is determined from the visual content of video data. The textual data is associated with corresponding regions and frames of the video data in which the corresponding on-screen text was detected. Users can select regions in the frames of the visual content to monitor for a particular triggering item (e.g., a triggering word, name, or phrase). During play back of the video data, the textual data associated with the selected regions in the frames can be monitored for the triggering item. When the triggering item is detected in the textual data, an alert can be generated. Alternatively, the textual data for the selected region can be extracted to compile supplemental information that can be rendered over the playback of the video data or over other video data.

20 Claims, 11 Drawing Sheets

(51) Int. Cl.

| | |
|---|---|
| *G06K 9/18* | (2006.01) |
| *G06K 9/00* | (2006.01) |
| *G06K 9/32* | (2006.01) |
| *H04N 21/234* | (2011.01) |
| *H04N 21/2343* | (2011.01) |
| *H04N 21/431* | (2011.01) |
| *H04N 21/4725* | (2011.01) |
| *H04N 21/488* | (2011.01) |
| *H04N 21/8549* | (2011.01) |
| *H04N 21/4722* | (2011.01) |
| *H04N 21/4728* | (2011.01) |
| *H04N 21/478* | (2011.01) |

(52) U.S. Cl.
CPC ............... *H04N 21/23418* (2013.01); *H04N 21/234336* (2013.01); *H04N 21/4316* (2013.01); *H04N 21/4722* (2013.01); *H04N 21/4725* (2013.01); *H04N 21/4728* (2013.01); *H04N 21/47815* (2013.01); *H04N 21/4882* (2013.01); *H04N 21/8549* (2013.01)

(56) References Cited

U.S. PATENT DOCUMENTS

| | | |
|---|---|---|
| 6,411,725 B1 | 6/2002 | Rhoads |
| 6,608,930 B1 | 8/2003 | Agnihotri et al. |
| 6,741,684 B2 | 5/2004 | Kaars |
| 6,801,261 B1 | 10/2004 | Haynes |
| 6,973,256 B1 | 12/2005 | Dagtas |
| 7,444,069 B1 | 10/2008 | Bernsley |
| 7,505,671 B2 | 3/2009 | Hagiwara et al. |
| 7,584,428 B2 | 9/2009 | Yeh et al. |
| 7,783,490 B2 | 8/2010 | Reichardt et al. |
| 7,886,003 B2 | 2/2011 | Newnam et al. |
| 7,889,073 B2 | 2/2011 | Zalewski |
| 7,992,167 B2 | 8/2011 | Candelore et al. |
| 8,020,183 B2 | 9/2011 | Ferman et al. |
| 2001/0049826 A1 | 12/2001 | Wilf |
| 2002/0170068 A1 | 11/2002 | Rafey et al. |
| 2004/0167767 A1 | 8/2004 | Xiong et al. |
| 2007/0041706 A1 | 2/2007 | Gunatilake |
| 2007/0214488 A1 | 9/2007 | Nguyen et al. |
| 2008/0091713 A1 | 4/2008 | Candelore et al. |
| 2008/0127253 A1 | 5/2008 | Zhang et al. |
| 2009/0150925 A1* | 6/2009 | Henderson ............. H04N 7/163 725/34 |
| 2010/0153984 A1 | 6/2010 | Neufeld |
| 2011/0063317 A1* | 3/2011 | Gharaat ............. G06Q 30/0244 345/545 |
| 2013/0014191 A1* | 1/2013 | Matsunobu ........ H04N 21/4622 725/109 |
| 2013/0182182 A1 | 7/2013 | Mountain |
| 2014/0082130 A1* | 3/2014 | Sharma .................. H04N 21/00 709/217 |
| 2014/0098293 A1 | 4/2014 | Ishtiaq et al. |
| 2014/0201773 A1* | 7/2014 | Neumeier .......... H04N 5/44591 725/19 |

OTHER PUBLICATIONS

U.S. Appl. No. 13/840,342 entitled "Attention Estimation to Control the Delivery of Data and Audio/Video Content".

International patent application No. PCT/US2012/65410 filed Nov. 16, 2012 entitled "Supporting Multiple Attention-Based, User-Interaction Modes".

Rui, Gupta, and Acero, "Automatically Extracting Highlights for TV Baseball Programs", Microsoft Research, 2000.

Kim, Jeong, Kim, and Chung, "A Personal Videocasting System with Intelligent TV Browsing for a Practical Video Application Environment"; ETRI Journal, vol. 31, No. 1, Feb. 2009.

Darin Brezeale and Diane Cook, "Learning Video Preferences Using Visual Features and Closed Captions", IEEE, 16:13, Jun. 17, 2009.

Nitta and Babaguchi, "Automatic story segmentation of closed-caption text for semantic content analysis of broadcasted sports video (2002)".

Lee, et.al.; "Emotionally Reactive Television", ACM IUI, Jan. 28, 2007.

Lee, et.al; "Viewer Responses to Interactive narrative"; (http://gel.msu.edu/carrie/publications/interactive_narrative_ICA.pdf), 2004.

Agamanolis, et.al. "Viper: A framework for responsive television", IEEE Multimedia 2003.

PCT Search Report & Written Opinion, RE: Application #PCT/US2014/048562; dated Oct. 22, 2014.

Official Action, RE: Canadian Application No. 2,923,807, dated Oct. 3, 2016.

* cited by examiner

GENERATING ALERTS BASED UPON DETECTOR OUTPUTS

CROSS-REFERENCES TO RELATED APPLICATIONS

The present disclosure claims priority to U.S. Provisional Patent Application No. 61/578,683, entitled "Generating Alerts Based Upon Detector Outputs," filed on Sep. 16, 2013, the content of which is incorporated herein by reference in its entirety for all purposes.

BACKGROUND

Videos can be used to convey a wide variety of audiovisual content. From entertainment video content, such as movies, television programs, music videos, and the like, to informational or instructional content (e.g., news broadcasts, documentaries, product advertisements, educational shows, etc.), video content offers a rich and effective means for communicating information.

Most contemporary video content is available in digital form and can be recorded or transmitted in one or more electronic formats. For example, traditional cable and satellite television service providers transmit live and prerecorded digital video signals to consumers over corresponding wired and wireless electronic communication media in real time according to a broadcast schedule. In addition many cable and satellite television service providers, and other web based services, have developed functionality to provide video content to consumers using so-called "video-on-demand" (VOD) systems. VOD systems allow service providers to provide specific video assets, such as television shows, movies, and the like, in response to user requests to any number of client devices for viewing.

Such live video and VOD content is usually transmitted as video data. The video data can include constituent visual data, audio data, and, in some instances, textual data (e.g., closed captioning data). In many of the video formats, the visual data is recorded as a sequence of frames that include still images resulting from the arrangement of pixels. Accordingly, the visual data can include a set of frames in which each frame includes a specific set of pixel data that, when rendered by a computer system, results in the corresponding visual content (e.g., images of people, places, and objects) of the video content.

In some scenarios, the visual content might include images of text. Images of text may include images of text on objects in a scene (e.g., words or characters on buildings, signs, or written documents, etc.). The visual content may also include rendered text superimposed over the images of a scene of the visual content. For instance, some television stations may embed on-screen text into visual content of a news broadcast to display summary information, captioning, or to introduce individual stories or segments. Similarly, talk shows may use on-screen text to identify people or topics, while programs showing or discussing sporting events may display on-screen text with running statistics about one or more games (e.g., score, period, time, etc.). Text that appears in the images of a scene or text that is embedded into or superimposed on the image of the scene are referred to herein as "on-screen text."

On-screen text is distinguishable from text rendered from textual data (e.g., a text string) in that on-screen text does not correspond to underlying data that includes specifications or other indications of the text. Rather, on-screen text is only recognizable by examining the images that result from rendering the corresponding pixel data of the visual data.

DETAILED DESCRIPTION

Described herein are techniques for systems, methods, and devices for generating alerts and supplemental information based on the detection of on-screen text and objects in video data. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

System Overview

Figure 1A:
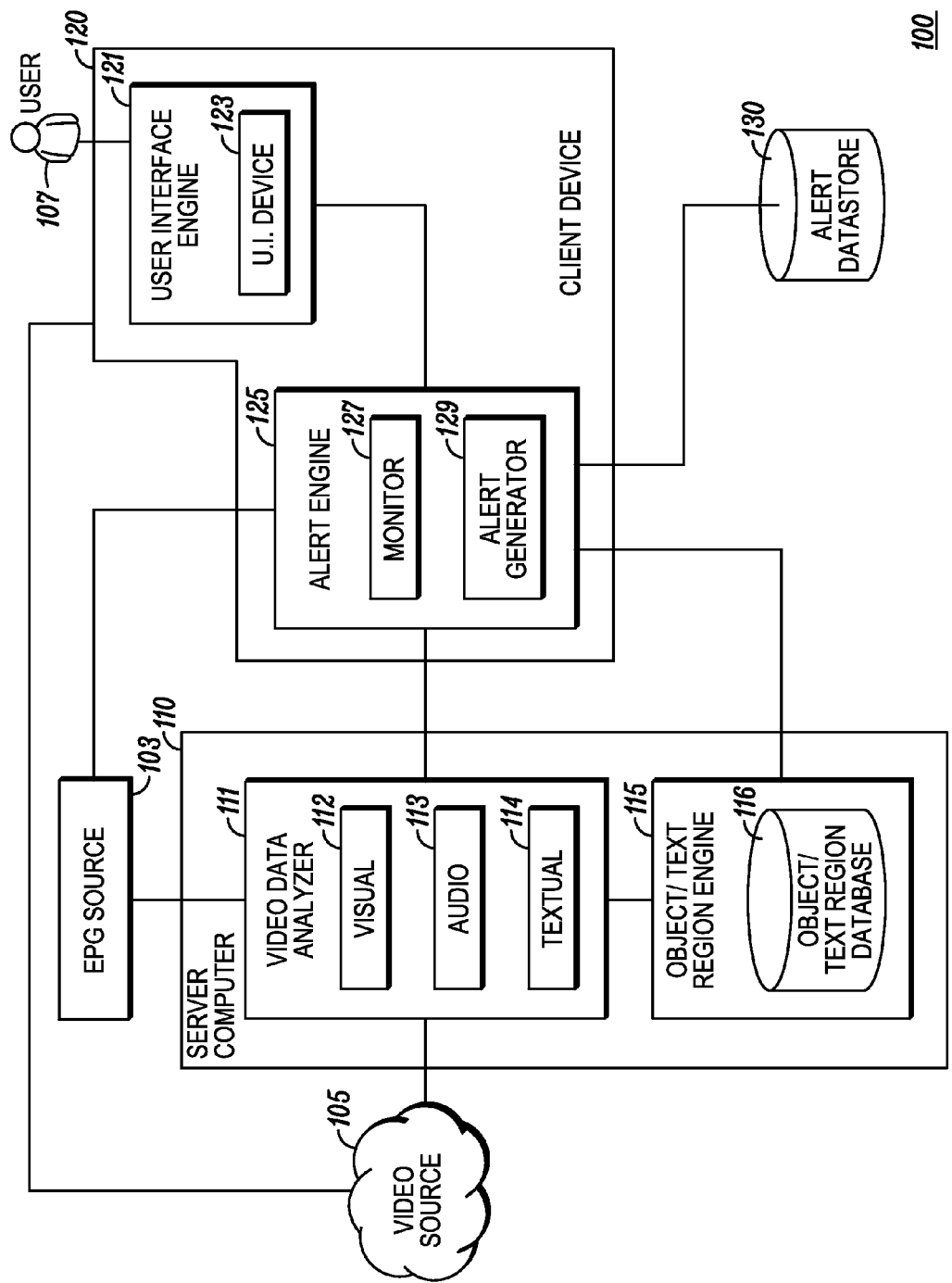
FIG. 1A illustrates a block diagram of a system for performing actions using on-screen data, according to embodiments of the present disclosure.

FIG. 1A depicts a high-level schematic diagram of a system 100 for providing enhanced alerting and user experience functionality associated with the consumption of video content. System 100 can provide a user interface that is superimposed over the visual video content. A user can designate a region of video content to monitor using the user interface. System 100 can monitor the designated region in the frames of the video content and perform various actions. In one embodiment, system 100 can monitor the designated region for user-specified key items (e.g., on-screen trigger words, phrases, names, objects, etc.) and perform an action when the key item is detected. For example, when system 100 detects a trigger word, it can generate an alert according to a particular alert definition.

In another example embodiment, system 100 can extract any or all of the on-screen text in the designated region over the course of the video playback. The extracted on-screen text can then be used to generate supplemental information. For example, the extracted on-screen text can be compiled into a text-based summary of the video content (e.g., a television program broadcast on a particular channel) up until a certain point in the play back (e.g., the point at which a user begins watching a television program already in progress). The on-screen text can also be used to generate a running account of the on-screen text. The running account of on-screen text can be embedded in superimposition over other video content (e.g., scrolling text superimposed over the video content of another television program broadcast on another channel).

The particular example system 100 depicted in FIG. 1A includes a server computer 110 and a client device 120 in electronic communication with one another. For example, server computer 110 can be a computer system at the headend facility of a cable television service provider used for distributing video content. Client device 120 can include any computing device or thin client device (e.g., desktop computer, laptop computer, tablet computer, smart phone, set-top-box, etc.) capable of receiving and decoding data and/or signals from the server computer 110.

In embodiments, video data is analyzed to generate the supplemental information. Server computer 110 can execute one or more software modules to implement various analytical functionality in accordance with embodiments of the present disclosure. In one embodiment, the server computer 110 can execute a video data analyzer 111 to analyze video data received from a video source 105. The video data analyzer 111 can include various content type specific modules for analyzing different types of content data included in the video data. For example, the video data analyzer 111 can include a visual data module 112, audio data module 113, and textual data module 114 for performing analysis on the visual data, audio data, and textual data components of the video data.

The server computer 110 can also execute an object/text region engine 115 to recognize, detect, or otherwise determine, regions of interest in the various frames of the video data. For example, the object/text region engine 115 can perform a preliminary analysis on the visual data to determine one or more regions that potentially contain on-screen text, logos, icons, or images of objects. The preliminary analysis can be preprocessing step performed before when the video data is produced. Alternatively, the preliminary analysis that identifies one or more regions of potential interest can be performed dynamically when the server computer 110 receives the video data. In one embodiment, determining regions that may be of interest can include performing a discrete cosine transformation (DCT) operation with specific coefficients and edge feature definitions. The identified regions can then be further analyzed by the visual data module 112.

In some embodiments, the object/text region engine 115 can determine regions in the video data that may contain on-screen text based on metadata associated with the video data. For example, the metadata can be received in the form of electronic program guide (EPG) data from one or more EPG sources 103 or be retrieved from the object/text region database 116. The EPG data can include information regarding the program lineup for a particular television/cable channel, while the data in the object/text region database 116 can be based on user input that identifies a particular region of interest for particular channels, video content, or video content types (e.g., the location of station identifiers or the location of captions in specific news programs).

In one embodiment, metadata stored in the object/text region database 116 can correlate specific EPG data to known or predetermined regions in the frames of the visual video data in which specific objects or text are typically or expected to be included. For example, video data received from a video source 105 may include a particular video asset (e.g., a movie, newscast, sports event, television program, etc.). The EPG source 103 can provide EPG data (e.g., start/stop times, duration, synopsis, channel designations, descriptions, categories, etc.) for that particular video asset. Based on the EPG data, the object/text region engine 115 can retrieve corresponding region data that includes specifications for one or more regions in the particular video asset in which objects or text may be expected to appear from the object/text region database 116. For example, if the EPG data indicates that a particular program is a financial news broadcast, then the object/text region engine 115 can access the object/text region database 116 to determine that that specific financial news broadcast, or a corresponding type of financial news broadcast on the specified channel, typically includes a logo in the bottom right-hand corner of the screen as well as scrolling text with information about stock prices along the bottom edge of the screen. In some embodiments, the specific video asset can be associated with a particular video asset identifier or a video asset category identifier with which the object/text region engine 115 can retrieve the corresponding potential monitoring regions from the object/text region database 116.

Once the specific regions are determined, the various software modules of the server computer 110, such as video data analyzer 111, can detect, extract, catalog, and correlate various visual, audio, and/or textual aspects of video content. As described herein, video data for video content can include a combination of visual data, audio data, and/or textual data corresponding to the visual, audio, and/or textual components of the video content. Accordingly, the video data analyzer 111 can include functionality for analyzing the visual data, audio data, and/or textual data individually to generate additional or supplemental data. Any data resulting from the analysis of the video data can be correlated to a corresponding frame and/or region in the visual content.

In one embodiment, the video data analyzer 111 can analyze the visual data contained within regions defined by the region data to determine data corresponding to the on-screen text or objects. The images in a frame of visual content can include an arrangement of pixels. Accordingly, in one embodiment, the analysis of the visual data within the regions can include performing an optical character recognition (OCR) operation to recognize patterns in the pixels that correspond to individual objects, characters, words, or phrases included in the visual data. The recognized patterns can then be associated with textual data or image data that describes the recognized patterns. The recognized on-screen text or object can then be associated with the corresponding regions in the frames or frame sequences in which it appears. Accordingly, the on-screen text or objects and their corresponding textual data and object data can be associated with the corresponding regions, frames, and/or video assets in which they appear.

In embodiments, text data corresponding to recognized on-screen text can include computer readable code that define specific characters or words (e.g., text strings defined by ASCII or binary codes). The textual data can then be associated with the regions, frames, and/or video assets in which the on-screen text was recognized. In such embodiments, the textual data can be provided, along with the original or transcoded video data to the client device 120, as supplemental data. As used herein the term "detector output data" describes data generated by the video data analyzer 111 including, but not limited to, supplemental data and its correlations to specific video assets, frames, and/or regions in the video data. The detector output data can be associated with multiple video assets from multiple video sources 105 (e.g., multiple television programs broadcast by multiple television channels).

The client device 120 can include modules implemented as combinations of hardware and software to provide various functionality that uses the detector output data. In one embodiment, the client device 120 can include a user interface engine 121. User interface engine 121 can include functionality for receiving, decoding, rendering, and displaying information received from various sources, such as video source 105, EPG 103, and server computer 110. In one embodiment, the user interface engine 121 can receive video data 105 for video content and render the component visual, audio, and textual components of the video content on one or more output devices (e.g., computer monitors, speakers, etc.).

In addition, the user interface engine 121 can receive EPG data and render it along with controls superimposed over the visual component of the video content. For example, user interface agent 121 can generate a graphical user interface (GUI) that includes GUI elements overlaid on the video content. In one embodiment, the user interface engine 121 can include or be coupled to a user interface device 123 (e.g., a remote control receiver, a touchscreen, a mouse, a camera, etc.) for receiving user input from a user 107. In such embodiments, the user interface device 123 can be used to interact with the underlying GUI generated by the user interface engine 121 and thereby control/interact with other components of system 100.

In some embodiments, the user interface engine 121 can provide access to the functionality of the alert engine 125. In one embodiment, the alert engine 125 can receive region data associated with video content that specifies one or more possible regions in which text or an object may appear. The alert engine 125 can then provide the region data to the user interface engine 121.

As described herein, the region data can be determined by the object/text region engine 115 by analyzing the video data to determine patterns in the pixels that might include on-screen text. In embodiments, the object/text region engine 115 can determine region data based on metadata received from the EPG source 103 or stored in the object/text region database 116. In some embodiments, the region data may be determined based on user input that defines a particular region received through the user interface device 123 (e.g., dragging and dropping a box around a particular region of interest in which the user expects to see text). In any such embodiments, the user interface engine 121 can include functionality that allows a user to select one or more of the regions in the visual video content that the object/text region engine 115 or the video data analyzer 111 has determined to actually or potentially contain on-screen text.

Based on the user input received from the user 107 through the user interface engine 121, the alert engine 125 can designate the selected regions as the monitoring regions. In one embodiment, the monitor module 127 can include functionality for locating the monitoring regions within the visual component of the video content based on corresponding region data.

In embodiments, the monitor module 127 can also determine a key item to monitor for in the monitoring regions. The key items can be defined by a particular pixel pattern (e.g., an image of an object or text) or a text string. When the client device 120 receives or plays back the video data 141, the alert engine 125, and in particular monitor module 127, can monitor the monitoring regions in the corresponding visual data for on-screen text or objects that match the key item. In one embodiment, monitoring the monitoring regions includes analyzing the corresponding detector output data to determine textual or image data associated with the specific region, frame, and/or video asset of interest. When the key item is detected in the designated monitoring region, the monitor module 127 can perform a predetermined dynamically determined action.

In one embodiment, the action can include generating an alert initiation message. The alert initiation message can be sent to the alert generator module 129. The alert generator module 129, in response to the alert initial message generated by the monitor module 127, can access the alert datastore 130 to determine one or more actions to perform. In one embodiment, the alert generator 129 can retrieve a predetermined alert definition associated with the key item, the user 107, and/or metadata associated with the video content. The association between the key item, the user 107, and/or the metadata and a particular alert definition can be stored in a relational database in the alert datastore 130. Alert definitions can specify various actions to be performed in response to the detection of a particular key item. For example, the alert generator 129 can retrieve an alert definition that specifies that the user interface engine 121 increase the volume of the playback associated with the audio component of the video content for frames in which the key item is detected.

Overview of Data Flow

Figure 1B:
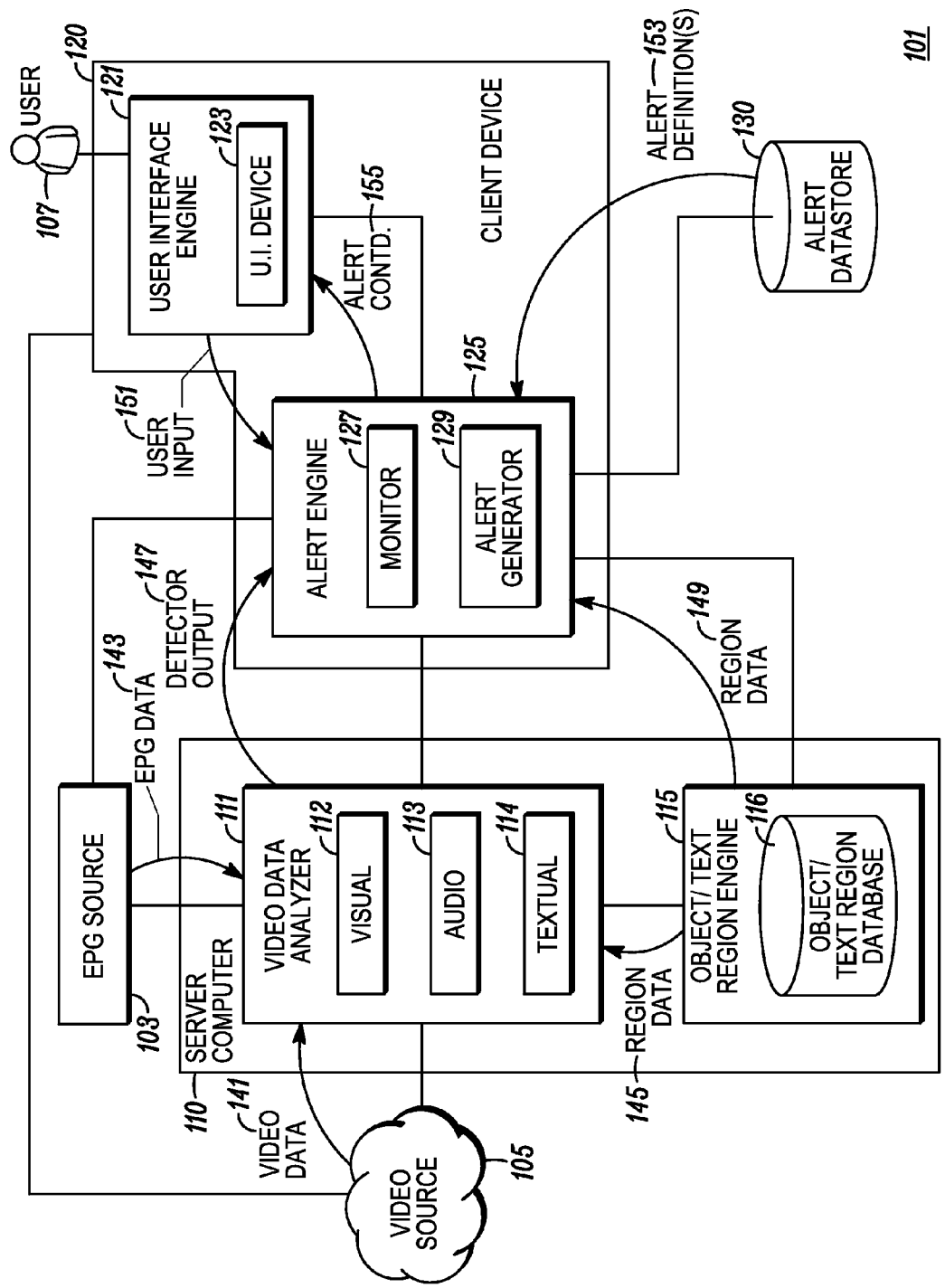
FIG. 1B illustrates data flow for performing actions using on-screen data, according to embodiments of the present disclosure.

To further illustrate various aspects and functionality of system 100, FIG. 1B illustrates a particular example data flow 101 according to embodiments of the present disclosure. While specific functions are described as being performed by specific modules in specific computer systems, any of the functionality described herein may be distributed among the server computer 110, the client device 120, and one or more other computer system (e.g., in a cloud computing environment).

As shown, the video data analyzer 111 can receive video data 141 from video source 105. The video source 105 can include any type of live or on-demand source of video content. For example, the video source 105 can be a cable television provider, a satellite television provider, a website, or the like. Accordingly, the video data 141 can include a live video stream or one or more stored files of video data. In either scenario, the video data 141 can include various formats of digital data.

The video data 141 can include digital data corresponding to the visual, audio, and/or textual components of the corresponding video content. For example, the video data 141 can include visual data, audio data, and/or textual data. In some embodiments, the video data 141 can include one or more video assets, such as television shows, movies, video clips, web videos, and the like.

In one embodiment, the video data analyzer 111 can receive EPG data 143 from the EPG source 103. The EPG data 143 can include metadata regarding the various video assets in the video data 141. For example, the EPG data can describe the divisions between the video assets (e.g., start/stop times) in the video data 141. The metadata in the EPG data 143 can be generated by the EPG source 103 in coordination with the video source 105. For example EPG data 143 can include published listings or schedules of programs offered by one or more video sources 105 (e.g., television networks, on-demand movie websites, etc.). The EPG data 143 can include information about the video data 141 in general and/or descriptions of the individual video assets. Such descriptions can include an identifier for a particular television program, movie, newscast, video clip, and the like. For example, the identifier can include a name of a sitcom, the title of the movie, the name of the television talk show, etc. In addition to the identifier, the EPG data 143 can include an indication of a classification or category of the type of video asset. Such indications can include designation associated with what content can be expected in a particular video asset. For example, a designation can classify a particular video asset as a newscast, a comedy, a sporting event, a talk show, a financial news show, or the like.

The video data analyzer 111, or one of its component modules, can use the EPG data 143 in the analysis of the video data 141. In one embodiment, the video data analyzer 111 can use the EPG data 143 to determine a context of the video data 141. The video data analyzer 111 can use the context to access the object/text region engine 115 or the object/text region database 116 to determine regions in the visual data in which to search for on-screen text or objects. The regions in the visual data can be defined by the region data 145. The region data 145 can include designations of the coordinates and area in which on-screen text or on-screen objects are expected to appear within the visual component of the video content. For example, if the EPG data 143 suggests that a particular video asset is a recording of a financial news broadcast, the object/text region engine 115 may determine that the video data analyzer should search for text in regions in the corners of the video content. In some embodiments, the EPG data 143 can indicate that the financial news broadcast is a specific program. Based on the identifier associated with a specific program, the object/text region engine 115 can access the object/text region database 116 to determine that program always includes a scrolling bar of text in the region of a specific height and length along the bottom edge of the screen. Accordingly, the video data analyzer 111 can designate those regions as regions that should be analyzed for on-screen text.

In one embodiment, the video data analyzer 111 can also use context indicated in the EPG data 143 to improve the accuracy of the analysis of the video data 141. For example, if the EPG data 143 for a particular video asset indicates that the video asset includes a sports talk show, then the video data analyzer can reference a specialized dictionary associated with sports talk shows to improve the accuracy of character recognition operations on the visual data component of the video data 141. The specialized dictionary may include vocabulary and names specific to the genre of sports shows that the video data analyzer 111 can use to eliminate at least some potentially erroneous recognized characters or words.

Analysis of the video data 141 can include recognizing on-screen text or on-screen objects, and generating corresponding textual data and/or image data. In some embodiments, textual data or image data can be associated with specific regions. Furthermore, the textual data or image data can be associated with specific regions within specific frames or ranges of frames within the video asset or video data 141. For example, textual data corresponding to on-screen text that introduces a particular segment within a news broadcast can be associated with specific frames within the program in which the specific on-screen text appears. In this way, the frames of the news broadcast can be compiled into segments based on specific on-screen text (e.g., the title, topic, or name of a particular news segment). Similarly, in some embodiments, the video data analyzer 111 can also detect the presence of particular on-screen images in regions of the visual content. For example, visual module 112 can detect the presence of a logo in the corner of the screen or the image of a person or object in other particular regions of the screen. Such image data can be used to identify a particular television show or television channel.

In some embodiments, audio module 113 and/or textual module 114 can analyze the corresponding audio data and textual data (e.g., closed captioning data) for audio or text in those components of the video data 141. The audio or text detected in the audio data and textual data of the video data 143 can be associated with the particular frames in which they are detected. Accordingly, the audio data and textual data can be used to further segment the video data 141 based on characteristics sounds (e.g., the sound of a particular person's voice, a particular song, a sound effect, etc.) or indications/markers in closed captioning data that indicates the beginning and end of a particular program. Segmentation of the video data 141 can be used by various components of the present disclosure to improve accuracy and efficiency of the analysis of the video data. For example, information about segments in the video data 141 can help the video analyzer 111 leverage the redundancy of the images in multiple frames of the visual content to improve the accuracy of character recognition of text in a frame in which the text is moving or otherwise difficult to recognize. If the text in one frame is difficult to recognize, the video analyzer 111 can analyze neighboring frames in the same segment to perhaps obtain a better image of the text (e.g., in better focus, higher contrast, etc.).

Any data detected in or extracted from video data 141 by the video data analyzer 111 can be associated with the corresponding regions and/or frames and compiled as detector output data. In one embodiment, the detector output 147 includes textual data corresponding to on-screen text detected in the visual data of the video data 141. Within the detector output data, textual data can be associated with one or more regions in one or more frames of various video assets. Similarly, image data can be associated with regions in one or more frames of video assets. In such embodiments, the regions associated with the textual data or image data can be defined by coordinates and areas associated with region identifiers or definitions. Accordingly, in some embodiments, alert engine 125 can receive the detector output 147 in which the textual data or image data is associated with a region identifier or definition. The alert engine 125 can then reference the region data 149 to determine the coordinates and area of a particular region associated with a specific region identifier.

In some embodiments, the alert engine 125 can first designate the regions of the visual data to be monitored for particular key item. In such embodiments, the alert engine 125 can receive the region data 149 directly from the object/text region engine 115. The alert engine 125 can reference the region definitions in the region data 149 to designate one or more potential monitoring regions. In one embodiment, the monitoring regions can be provided to the user interface engine 121. User interface engine 121 can generate one or more GUIs elements in a GUI superimposed over the corresponding visual content of the video content to indicate which regions can be monitored. For example, the user interface may generate selectable control boxes around regions of the visual content that the user 107 may select to be monitored. The user interface engine 121 can then receive a selection of one or more of the regions. The alert engine 125 can receive user input 151 designating a particular region to monitor and/or the key item that will trigger an alert.

The monitor module 127 can monitor the specified monitoring region for the key item. In one embodiment, monitoring for the key item in the monitoring region can include analyzing the detector output 147 to determine the frames in which the monitoring region contains textual data or image data corresponding to the definition of key item. In one embodiment, when the key item is detected in the monitoring region, the monitor module 127 can generate an alert.

The alert can include output an alert initiation message that activates the alert generator 129.

The alert generator can access the alert datastore 130 to retrieve an alert definition 153 based on information in the alert initiation message, such as the key item and/or the monitoring region. The alert definitions 153 can specify specific actions to be performed once the alert is initiated. For example, an alert definition 153 can specify generating and sending an alert command 155 to the user interface engine 121. The alert command 155 can include instructions that the user interface engine 121 can use to augment the playback of the video data 141. For example, the user interface engine 121 can change the playback volume of the video data 141 or insert additional messages or visual indications of the alert (e.g., flashing highlights around the region or the on-screen text corresponding to the key item).

In one embodiment, the alert engine 125 can forgo monitoring one or more regions for a particular key item. Instead, the alert engine 125 can extract any and all textual data or image data associated with one or more regions in the detector output 147. Extracted textual data or image data can be stored and associated with the particular video asset or sent to the user interface engine 121 in the alert command 155. User interface engine 121 can use the textual data or image data to generate a user interface to be superimposed over the video data 141 associated with the detector output 147 or another video data 141 unrelated to the detector output 147 (e.g., over a television program on another channel). The textual data extracted from the video data 141 from a particular monitoring region can then be used by the user interface engine 121 to generate various types of informational or control user interface elements that describe the content of the video data 141.

Figure 2A:
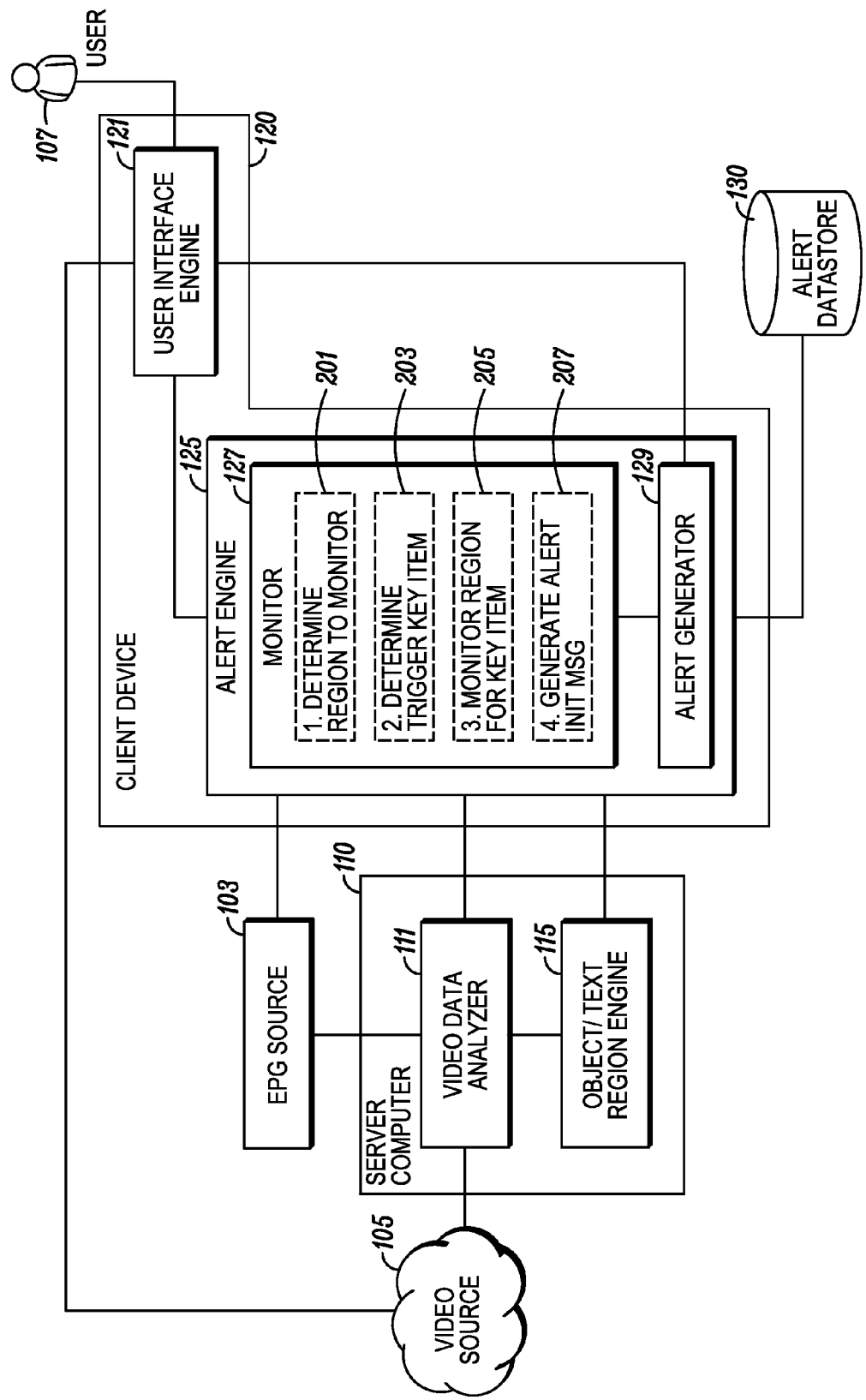
FIGS. 2A through 2C depict functionality of system components for performing actions using on-screen data, according to embodiments of the present disclosure.
Figure 2B:
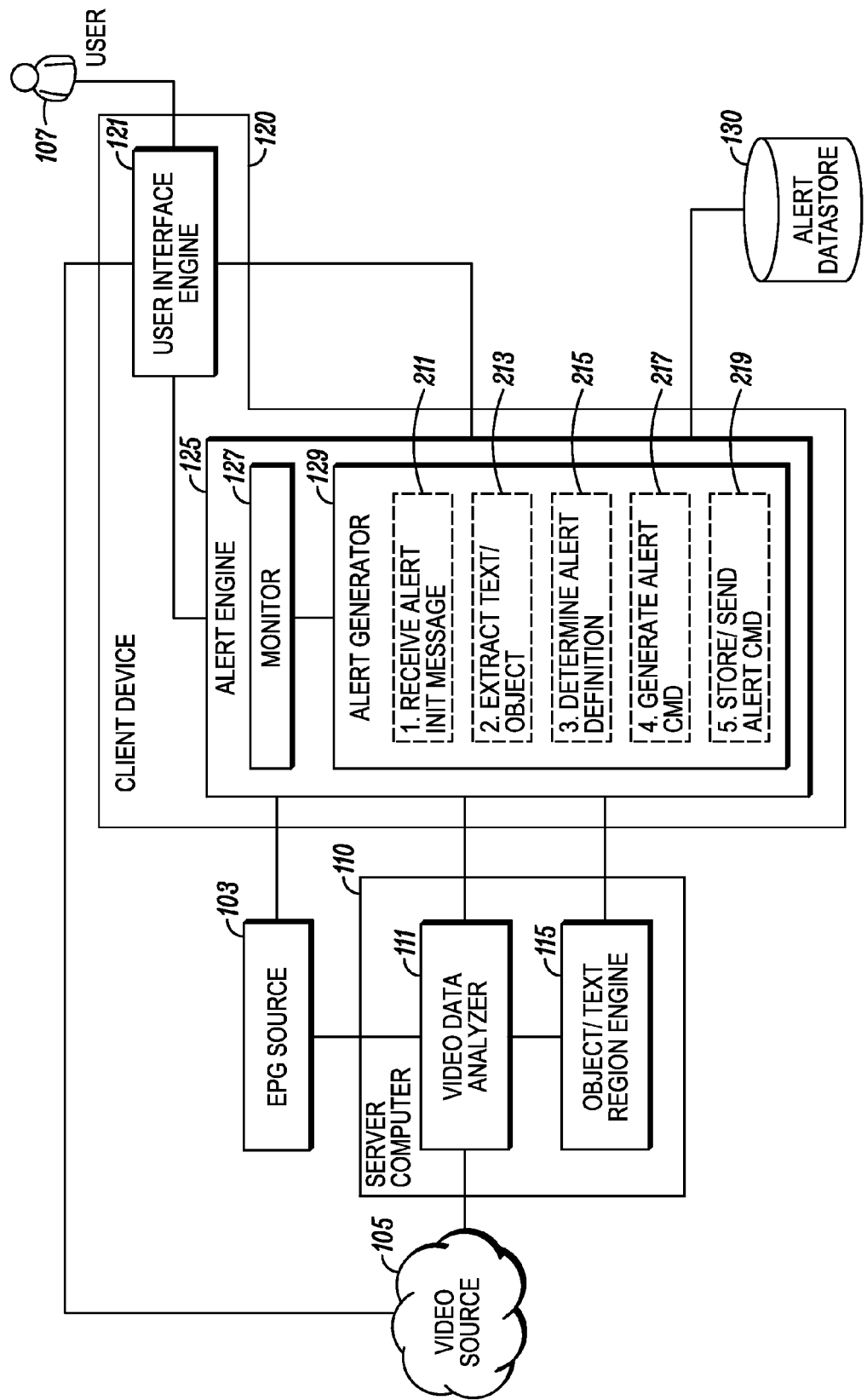
Figure 2C:
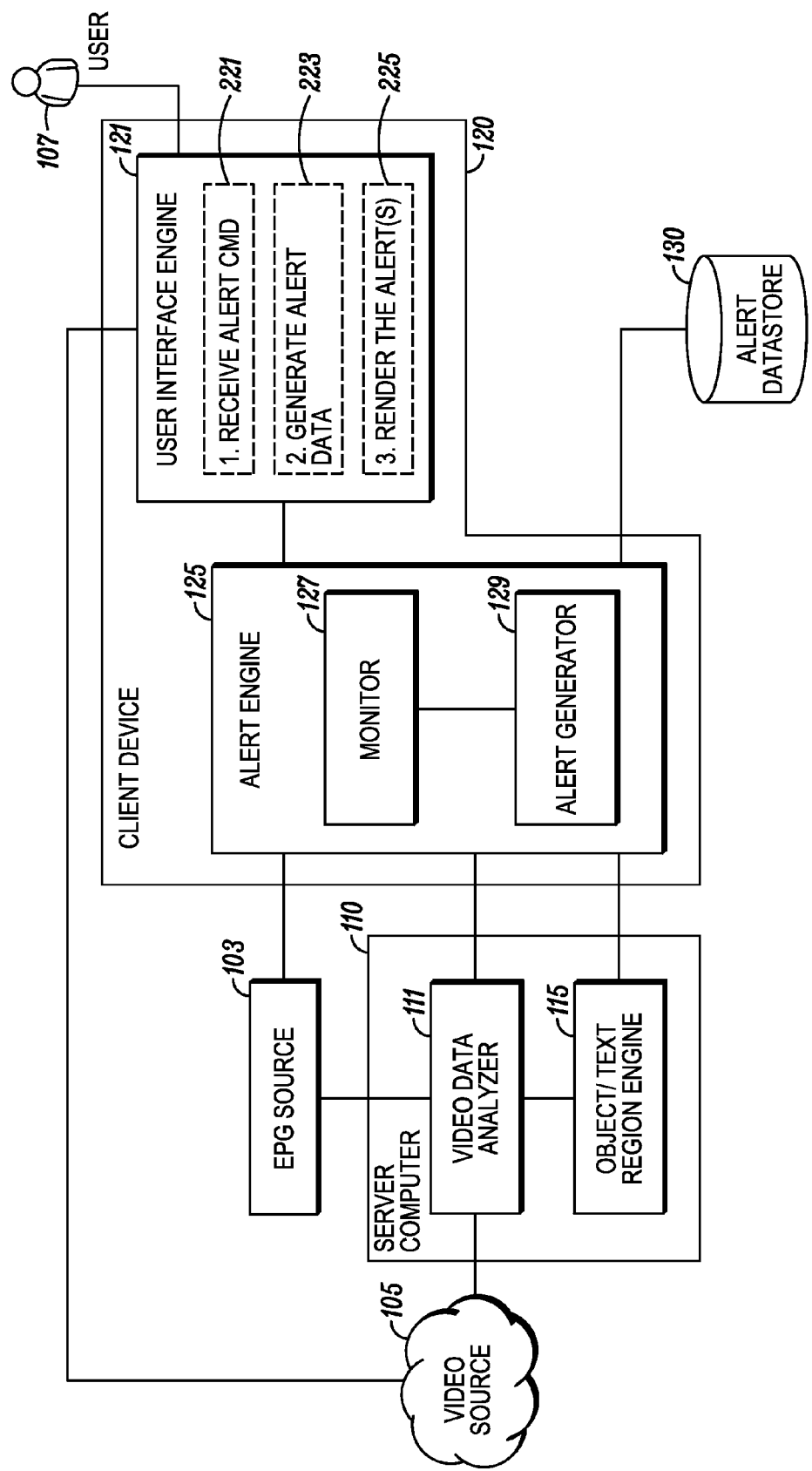

FIGS. 2A through 2C illustrate the functionality of the various components of the alert engine 125 and the user interface engine 121, according to various embodiments of the present disclosure.

Alert Engine

FIG. 2A illustrates the functionality of monitor module 127 of the alert engine 125. At block 201, the monitor module 127 can determine one or more particular regions in the frames of video data to monitor. Determining the regions to monitor can include receiving user input from a user 107 through the user interface engine 121. Alternatively, determining the region to monitor can include retrieving region data from the object/text region engine 115. In such embodiments, the designated monitoring region can be identified by a unique monitoring region ID and associated with one or more frames of a particular video asset. The monitoring region can be defined by coordinates within the frame (e.g., an XY pixel designation) and a corresponding area (e.g., a length and a width in pixels or other dimensional units).

At block 203, the monitor module 127 can determine a triggering key item. In one embodiment, the monitor module 127 can determine the key item in response to user input received through the user interface engine 121. In such embodiments, the user interface can generate a GUI with controls for selecting on-screen text in the visual content based on corresponding detector output 147. Controls displayed over a given frame in the video, such as selectable regions around the on-screen text, can be correlated to corresponding textual data in the detector output 147 for that frame. When a user 107 selects the highlighted region around the on-screen text, the corresponding textual data can be used as the key item. For example, in a news program one or more regions of the visual content may include listings of upcoming stories while another region includes a description of the current news story. In such scenarios, a user 107 can select the region surrounding on-screen text corresponding to an upcoming news story to use the corresponding textual data as the key item to monitor for in the region that includes a description of the current news story. In this way, the monitor module 127 can determine when the new program begins discussing the key item (e.g., the selected news story of interest).

In another embodiment, the GUI can include a text field into which a user 107 can enter a text string that can be used as the key item. In such embodiments, the user 107 is free to enter any text string into the field and is not limited to on-screen text options. Free-form entry of text strings advantageously allows a user 107 to monitor any and all regions of the visual content for an arbitrary key item. Such capability can be useful when a user 107 is only aware of a word or two of search string.

In similar embodiments, the GUI can include controls for selecting a particular image, icon, or identifier for a particular object or person as the key item. The key item can be defined by a particular pattern or general pattern of pixels. For example, the key item can be defined by pixels arranged to form an image of the key item.

In various embodiments, the key item can include specifications for multiple key items. Accordingly, the key item can specify multiple text strings or images of objects. The specification of multiple key items can be used to generate multiple corresponding alerts.

At block 205, the monitor module 127 can monitor the one or more monitoring regions for the key item. Monitoring for the key item can include comparing textual data or image data in the detector output 147 corresponding to the monitoring regions in multiple frames. Specifically, for each frame in a particular video asset, the monitor module 127 can access the detector output 147 to determine the corresponding textual data or image data for the regions in the frame. The corresponding textual data or image data can be compared against the key item definition. In some embodiments, the textual data associated with the monitoring region for a particular frame in the detector output 147 may be compared with the text string of the key item definition. In other embodiments, image data associated with the monitoring region for a particular frame of the detector output 147 may be compared with the pixel pattern of a particular object in the key item definition. Accordingly, the comparison of the visual content in the monitoring region with the key item can be performed on a pixel level or at a textual data level.

The monitoring functionality of block 205 can continue for a predetermined amount of time (e.g., for the duration of a particular video asset) or indefinitely (e.g., until user 107 manually stops the process). When the monitoring module 127 detects a matching pixel pattern or text string in the monitoring region, it can generate an alert initiation message at block 207. In one embodiment, generating an alert initiation message can include storing an entry in an alerts table. In another embodiment, generating an alert initiation message can include issuing a function call to an alert generation routine, such as alert generator module 127. In such embodiments, the function call can include some or all of the key item definitions and/or the textual data detected in the monitoring region.

Alert Generator

FIG. 2B illustrates the functionality of alert generator 129 of the alert engine 125 for performing one or more actions in response to the detection of a key item, according to various embodiments of the present disclosure. In one embodiment, at box 211, the alert generator 129 can receive an alert initiation message that corresponds to the detection of one or more key items in one or more monitoring regions in frames of video data 141. As described herein, the alert initiation message can include textual data or other data corresponding to the key item and or the key item definition. In one embodiment, the alert initiation message can include information corresponding to the user 107, such as a user ID, who defined the key item.

At box 213, alert generator 129 can extract the textual data or object data from the alert initiation message. For example, if the key item detected includes a particular word or phrase, then the extracted textual data can include a text string corresponding to the particular word or phrase.

At box 215, the alert generator 129 can determine an alert definition based on the information included in the alert initiation message and/or preferences associated with the user 107. In one embodiment, alert generator 129 can access the alert database 130 to retrieve one or more alert definitions associated with the information in the alert initiation message. For example, alert definitions maybe associated with a particular key item and/or a user identifier. In such embodiments, the alert definition determined by the alert generator 129 can include specifications for generating an alert command that can be issued to a user interface engine 121 to generate a corresponding alert. The specifications for generating an alert command can include indications for the type of alert (e.g., an audio alert or a visual alert), the placement of the alert (e.g., in the middle of the screen on a particular corner of the screen), the duration of the alert (e.g., how long the alert should remain displayed on the screen), and the like. Various illustrative examples of alert definitions and the resulting alerts are discussed in more detail below in reference to FIG. 3A through 3F.

At box 217, the alert generator 129 can generate the alert command based on the alert definition. The alert command can include computer executable instructions that the user interface engine 121 can use to generate a specific alert. In one embodiment, the alert command can be formatted specifically for the target user interface engine 121 or the target client device 120. For example, an alert command for a user interface engine 121 instantiated in a smart phone can be different from the alert command for a user interface engine 121 instantiated in a set-top box. In yet another embodiment, the alert command can include instructions for the alert command to be sent to another client device, such as a laptop or tablet computer, different from the client device 120 in which the alert engine 125 and the user interface engine 121 reside. For example, an alert command can include instructions that the alert command be routed to smart phone associated with the user 107 to alert the user 107 even if he/she is away from the television on which the video data 141 is being displayed.

At box 219, the alert generator 129 can store the alert command in a memory, such as the alert datastore 130, or transmit or send the alert command to the user interface engine 121. In embodiments in which the alert command is stored, the alert command can be associated with the particular regions and/or frames of the video data that trigger the generation of the alert command.

User Interface Engine

FIG. 2C illustrates the functionality of the user interface engine 121 for generating alerts according to various embodiments of the present disclosure. At box 221, user interface 121 can receive an alert command. As described herein, the alert command can include detailed specifications or instructions for the actions that the user interface engine 121 should perform to generate the appropriate alert to one or more users.

In response to the alert command, the user interface engine 121 can generate the alert data, at box 223. In one embodiment, the alert data can include a combination of visual data, audio data, and/or textual data. For example, the visual data can include renderable alert text data and/or image data (e.g., an alert icon). The visual data can also include specifications for the placement of the rendered alert text or image (e.g., in the corner of the screen or the middle of the screen). The audio data can include a sound file or identification of a sound file that the user interface engine 121 can use to playback an alert sound (e.g., a bell, chime, etc.). In one embodiment, the audio data can also include instructions regarding the volume for the playback of the video data 141. For example, the alert data can indicate to the user interface engine 121 or the client device 120 to increase the volume of the playback of the video data 141 for all the frames in which the key item is detected and then return it to a lower volume or muted volume for frames in which the key item is not detected.

In some embodiments, the alert data can include instructions for rendering the detected key item in video data other than the video data 141 being monitored by the alert engine 125. For example, the alert engine 125 can be configured to monitor for a key item in a specific region of the screen of a television program being broadcast on one channel and to initiate an alert command that causes the user interface engine 121 to render the key item, or some other alert, over another television program being broadcast on another channel. In such embodiments, a user can choose to monitor the status of one sports event (e.g., the score of a particular basketball game) broadcast on one station while watching another program (e.g., a movie) on another station. For instance, anytime one of the teams score, the network broadcasting the game may render an updated score or other notification that embodiments of the present invention can detect and then use to alert the user watching a movie on another channel.

At box 225, user interface engine 121 can render the alert or alerts according to the alert data. In one embodiment the alert is rendered on the client device 120. In other embodiments, the rendering the alert can include sending a message or command to another device (e.g., a smartphone, personal computer, etc.) separate from the client device 120 to render the alert. In yet another embodiment, an alert message can be rendered on multiple devices to alert multiple users. For example, rendering the alert can include initiating simple message service (SMS) messages to the multiple smartphones.

Example Alerts and Supplemental Information

As discussed above, embodiments of the present disclosure include recognizing on-screen text and objects in video data and performing actions based on and/or using the corresponding textual and image data. In embodiments, the actions performed are defined by alert definitions. In some of the embodiments described herein, the action includes generating an alert based on the detection of a particular key item. In other embodiments, the actions include extracting the textual data and image data from a particular region in the video data 141 and generating an alternate or supplementary view of the data. To further illustrate the actions that can be performed, FIGS. 3A through 3F depict user interfaces that illustrate example action types and corresponding alert definitions.

Figure 3A:
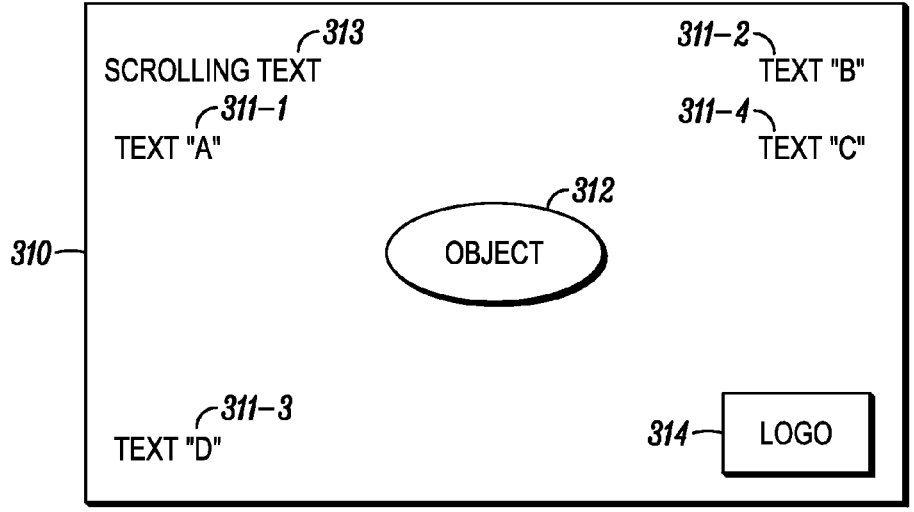
FIGS. 3A through 3G depict illustrative user interfaces for performing actions using on-screen data, according to embodiments of the present disclosure.

For example, FIG. 3A illustrates a user interface 300 displaying various visual video content A (reference 310). The visual content A (reference 310) may include images rendered according to corresponding visual data of a particular video data 141. Accordingly, the visual video content A (reference 310) of FIG. 3A represents a single frame of many frames of the video data 141.

As illustrated, the visual video content A (reference 310) may include on-screen text 311 in various locations within the frame. In addition, the visual video content A (reference 310) may include images of objects 312 and icons or logos 314.

In video data 141, motion can be simulated by changing the location of objects and text within the frame across multiple frames. Accordingly, the single frame of visual video content A (reference 310) may also include scrolling text 313, which would appear to be stationary text in any one frame. In addition to the visual video content A (reference 310), represented here as single still image, the video data 141 may also include audio data, such as sounds that can be played in coordination with the display of the various frames. In such embodiments, the volume of the audio data can be reproduced at various levels according to settings or levels determined in the audio data as well as by the playback device (e.g., client device 120). In the particular example shown, the volume of the audio data has a volume setting of 1 (reference 315).

Figure 3B:
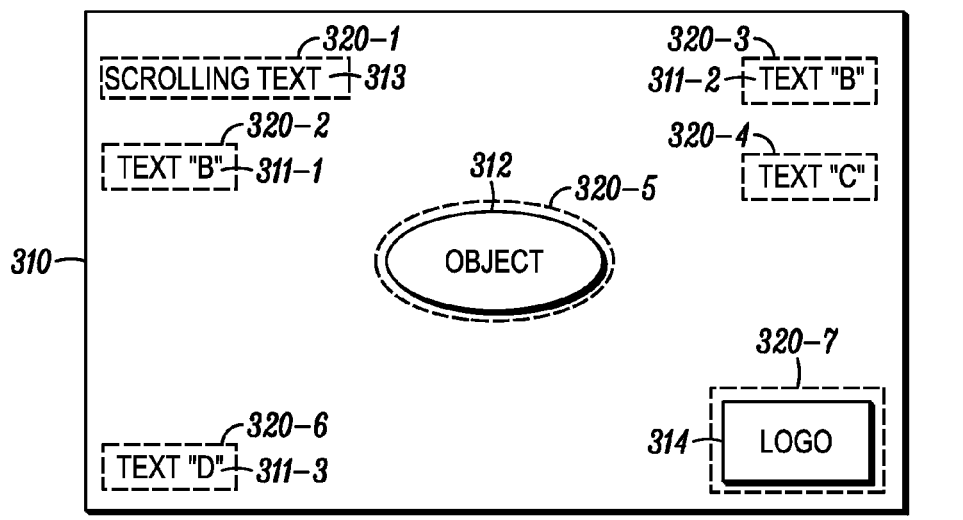

FIG. 3B illustrates a representation of a user interface 301 with GUI elements for identifying regions of the visual video content A (reference 310) that potentially contain on-screen text or images. Specifically, user interface 301 represents an embodiment of the present disclosure in which the video data analyzer 111 can analyze the visual data corresponding to the visual video content A (reference 310) to identify the various regions 320 that may contain on-screen text, objects, and/or logos. As described herein each region 320 can be defined by a particular set of coordinates and/or an area within the frame of the visual video content A (reference 310). The regions 320 can be determined based on analysis of the pixels within the frame and/or metadata associated with the video data 141 from which the visual video content A (reference 310) is rendered. For example, if the visual video content A (reference 310) is broadcast by particular network, the metadata may indicate that the logo 314 is always placed in the lower right-hand corner region 320-7 of the frame. Similarly, if the visual video content A (reference 310) is from a news program broadcast at a particular time, then the metadata may indicate that on-screen text located in the top left-hand corner region 320-1 is scrolling text 313.

In some embodiments, the video data analyzer 111 can analyze the pixels within each region 320 to generate corresponding textual or object data. For example, for the regions 320-2, 320-3, 320-4, and 320-6, the video data analyzer 111 can perform an OCR operation on the pixels within those regions to generate corresponding textual data. In some embodiments, the resulting textual data can include text strings or computer readable representations of the on-screen text and ASCII or binary codes. Similarly, the video data analyzer 111 can also analyze the pixels within regions 320-5 and 320-7 to extract pixel patterns associated with object 312 or logo 314. The pixel patterns can be used as the object data that corresponds to the images of the objects 212 or the logo 314. In some embodiments, the pixel patterns can be scaled or augmented so that images similar to the image of object 312 or logo 314 can be matched regardless of angle, size, perspective, or other visual variation. The textual data and object data can be associated with the corresponding regions, frames, and video data 141. The user interface engine can then use the associated textual data/object data and region data to generate GUI elements for receiving user input that designates specific regions 320 as monitoring regions and/or specific on-screen text and objects as key items.

Figure 3C:
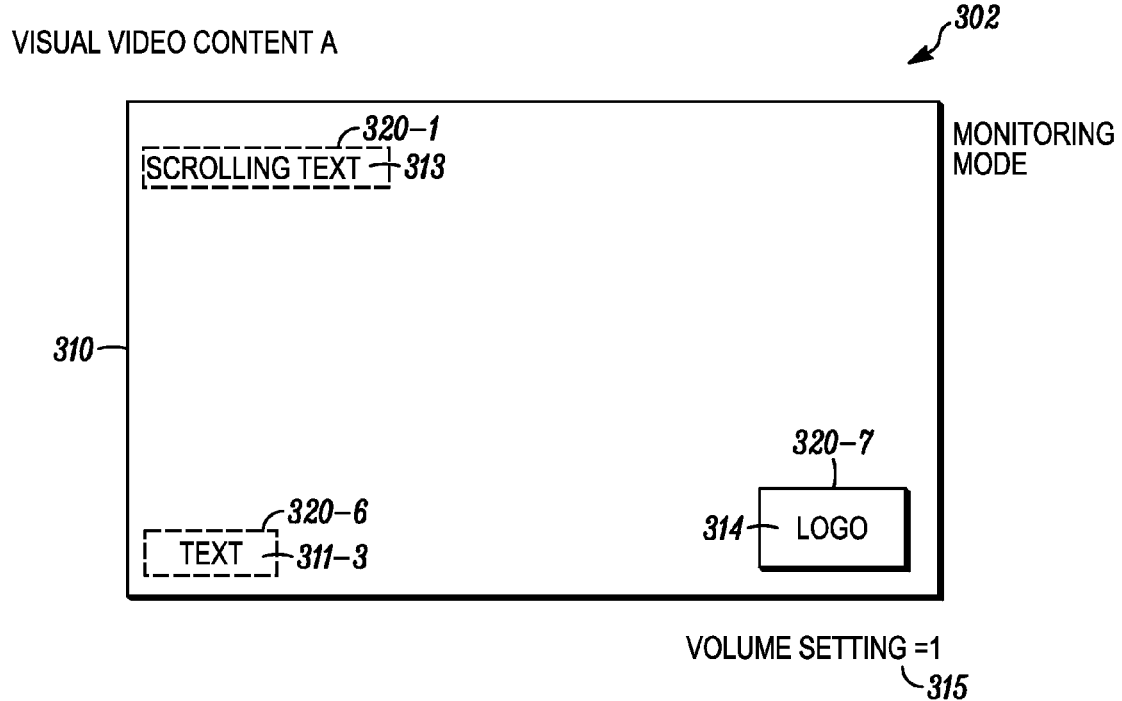

FIG. 3C depicts a user interface 302 that illustrates specific regions 320-1, 320-6, and 320-7 are designated as monitoring regions by the alert engine 125 and/or the user interface engine 121. FIG. 3C also illustrates how specific on-screen text and on-screen object can be selected as key items. For example, any or all of on-screen text 320-1 and 320-6 and/or logo 314 can be selected by a user through the user interface engine 121 based on textual data or object data in the detector output data 147 corresponding to the region and frame from which it was selected. Accordingly, once the monitoring regions and/or key items are defined, the alert engine can enter a monitoring mode. The type of monitoring mode can be customized by the user 107. For example, the user may select or specify a specific alert definition 153 that designates the actions to perform. In embodiments of the present disclosure, actions include both alert generation and supplemental information generation based on-screen text and objects. FIGS. 3D to 3G illustrate example actions as defined by alert definitions according to embodiments of the present disclosure.

Figure 3D:
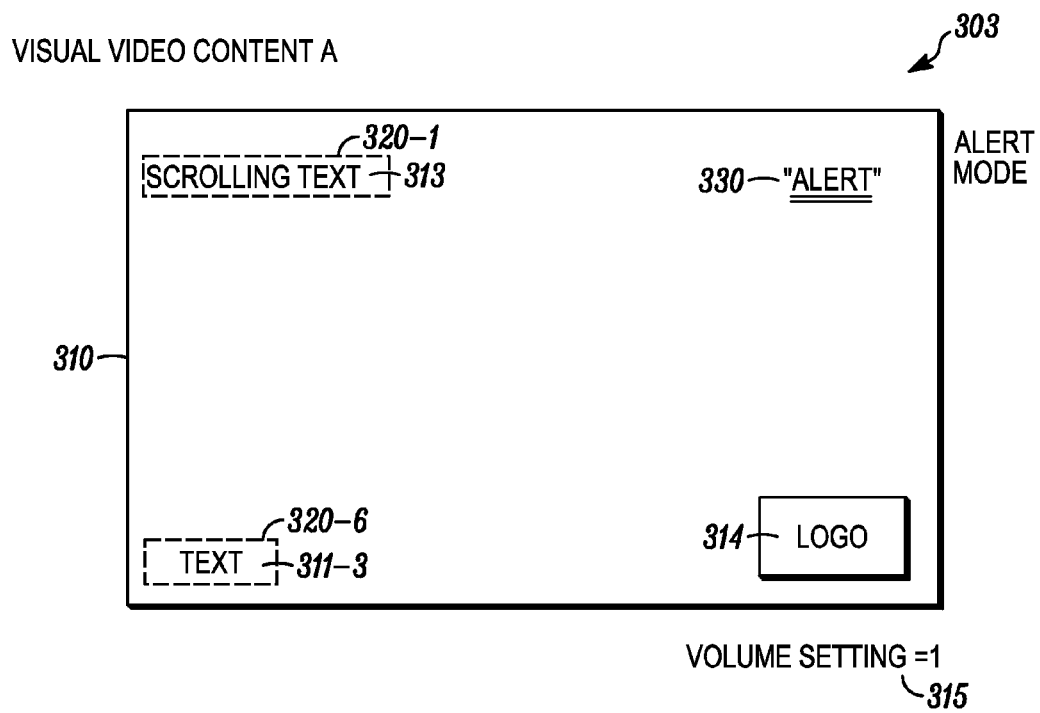

FIG. 3D depicts user interface 303 that illustrates example monitoring and alert functions according to various embodiments of the present disclosure. In the particular example shown, per FIG. 3C, regions 320-1 and 320-6 have been designated as monitoring regions that alert engine 125 will monitor for a key items to appear in the video data 141. The monitoring region 320-1 is designated as a scrolling text monitoring region in which the on-screen text is expected to change over some range of frames. Monitoring region 320-6 is designated as a static text monitoring region in which on-screen text is expected to remain static over some range of frames. In this example, the key items include on-screen. The words "TEXT" 311-6 and "SCROLLING TEXT" 313 are depicted only as placeholders. The actual textual data used to define the key item can include any character, word, or phrase. For example, the alert engine 125 can monitor for one or more trigger words in the scrolling text monitoring region 320-1 and/or the same trigger word or a different trigger word in the static monitoring region 320-6 in a particular video asset (e.g., a news broadcast). When the alert engine 125 detects the trigger word or words, it can generate an alert command according to a predetermined alert definition. In the example shown, the alert definition specifies that a visual alert 330 (e.g., the word "ALERT") be rendered over the visual video content A (reference 310) that the alert engine 125 is currently monitoring and the user 107 is viewing. In another embodiment, the visual alert 330 can be rendered over the visual content of another video asset (e.g., the word "ALERT" can be rendered over a movie being viewed on another channel).

The alert definition 153 can also specify other visual or audio characteristics of the alert. For example, the alert definition 153 can specify the location, size, color, brightness, contrast, and behavior (e.g., flashing, blinking, etc.) of the visual alert 330. In one embodiment, the alert definition 153 can specify over which video content the alert should be rendered. For example, the alert definition can specify that the visual alert 330 be rendered over any active video content (e.g., any television program on any channel) or it can specify that the visual alert 330 should only be rendered over specific or similarly categorized channels. For example, the alert definition 153 can specify that visual alerts 330 triggered by monitoring a news broadcast should only be superimposed over other news broadcasts and never over a movie.

Figure 3E:
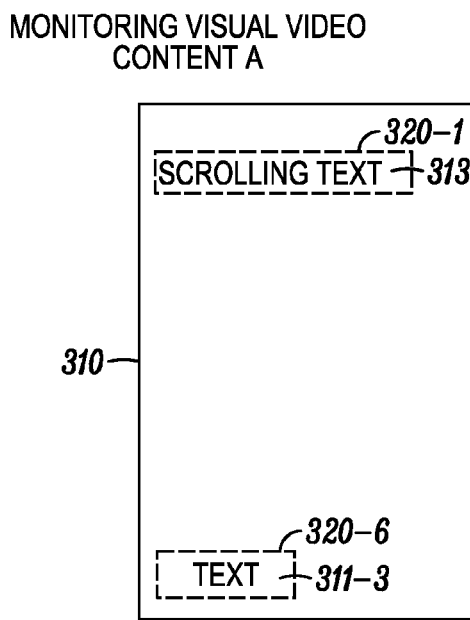

FIG. 3E depicts a user interface 304 for monitoring the visual video content A (reference 310) that generates a change in volume setting 335 when a specific trigger word is detected in one of the monitoring regions 320-1 or 320-6. In the specific example shown, the volume setting 335 is set to level 10 to signify an increase in the playback volume of the video content corresponding to the visual video content A (reference 310) relative to the playback volume setting 315 set to level 1 in FIGS. 3A through 3D. Accordingly, a user 107 can have the playback of the video content muted or lowered and set the alert engine to monitor for a specific topic in one of the monitoring regions. When keywords associated with that topic are detected in the monitoring regions, the alert engine 125 can initiate an alert command that the client device 120 can use to increase the playback volume to attract the attention of the user 107. Similarly, when the alert engine 125 detects that the keywords associated with the topic of interest are no longer detected in the selected monitoring regions, the alert engine 125 can initiate an alert command that again reduces the playback volume to a lower or muted level.

Figure 3F:
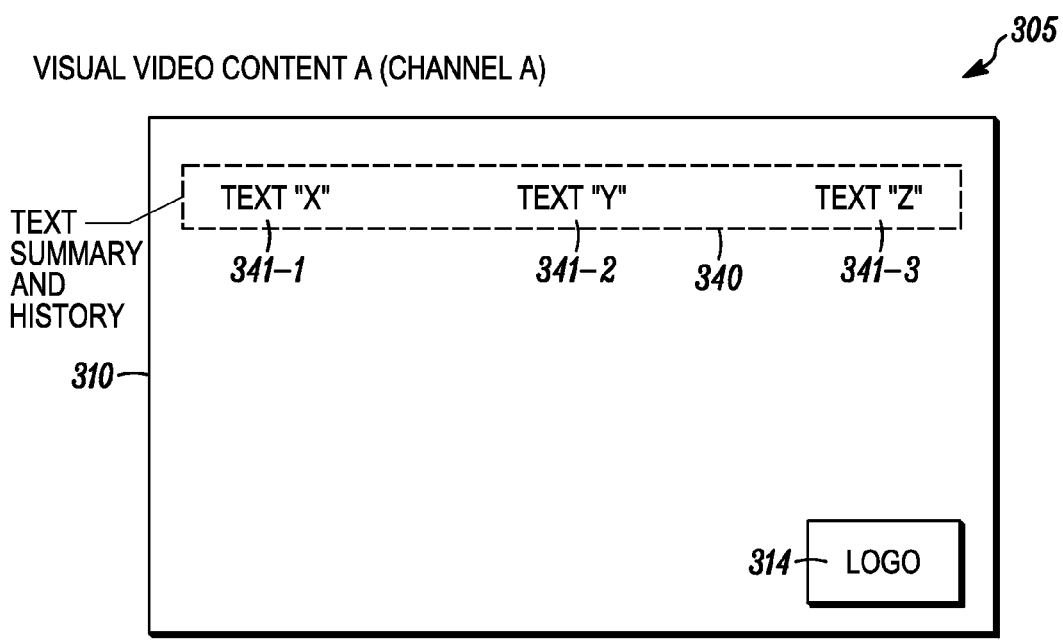

FIG. 3F depicts a user interface 305 illustrating another action that the alert engine 125 can perform while monitoring various monitoring regions 320 within the visual video content A (reference 310). In such embodiments, the alert engine 125 can monitor one or more monitoring regions 320 and record any and all textual data corresponding to on-screen text detected within those regions. Accordingly, the historical view 340 of the textual data can be rendered at any point within the playback of the video content. In such embodiments, when a user 107 begins watching a particular video asset, such as a sitcom, in the middle of the playback, the alert engine 125 and/or the user interface engine 120 can generate and render historical view 340 that includes a listing of on-screen text 341 detected in monitoring region 320-6 of the visual video content A (reference 310) shown in FIG. 3B. The listings of the on-screen text 341 can be in sequential order corresponding to the order in which they were detected in the linear viewing of the video asset. Alternatively the order of the on-screen text 341 in the historical view 340 can be arranged in order of frequency of detection.

In some embodiments, the historical view 340 of the on-screen text 341 can include controls for navigating to one or more corresponding points within the video asset. For example, each one of the on-screen text indicators 341 can include a hyperlink that would navigate to one or more sequences of the frames in which the corresponding on-screen text 341 was detected. Such embodiments enable enhanced nonlinear viewing (e.g., on-demand or prerecorded programs) of a particular video asset.

Alternatively, the historical view 340 of the on-screen text 341 can provide the user with a summary of the video asset up to a particular point when viewing the video asset in linear manner (e.g., live programming) In such embodiments, the extraction and display of the textual data associated with particular monitoring region 320 can be specified by the user when selecting a particular monitoring region 320. The extraction of the textual data may be specified by the selection of a particular alert definition. For example, the user interface engine 120 can render indications of potential monitoring regions that a user 107 can select for monitoring.

The user interface engine 120 can also offer an option for selecting a particular alert definition that defines the extraction and/or recording of the corresponding textual data from the detector output data 147 corresponding to the monitoring region in the video asset. In other embodiments, the alert engine 125 can default to extracting and recording the textual data from any selected monitoring region 320 whenever a particular monitoring region 320 is selected and associated with a particular alert definition.

While the example historical view 340 of on-screen text 341 is depicted as being rendered over the currently viewed visual video content A (reference 310), other embodiments of the present disclosure include rendering historical view 340 of on-screen text 341 over other video content (e.g., rendering the historical view 340 over a program being aired on another channel).

Figure 3G:
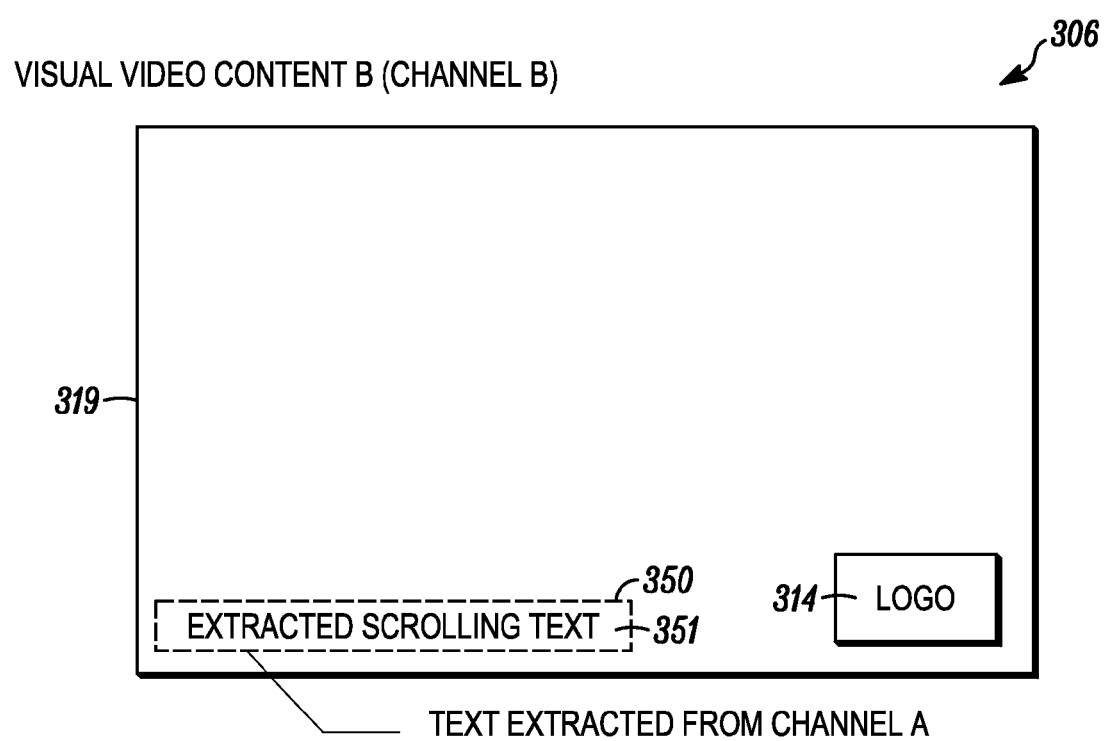

FIG. 3G illustrates an example embodiment in which extracted scrolling text 351 is rendered in a region 350 of the visual video content B (reference 319) based on the scrolling text 313 detected in monitoring region 320-1 of the visual video content A (reference 310) shown in FIG. 3E. Accordingly, the scrolling text from one program broadcast on one channel, such as scrolling stock prices from a financial news program, can be extracted and superimposed over the visual video content of another program, such as a movie, broadcast on another channel or being played on-demand.

In one embodiment, textual data can be extracted or collected from multiple sources, such as other video assets, news feeds, websites, social media networks, and the like, and aggregated so it can be rendered over and viewed in one or more video assets. For example, a user 107 can select one or more key items that represent a particular topic and the alert engine 121 and/or the video analyzer 111 can access various sources to retrieve information related to the topic. The aggregated view of the collected text can then be displayed to the user 107 in the format and over the video asset of his or her choice.

Figure 4:
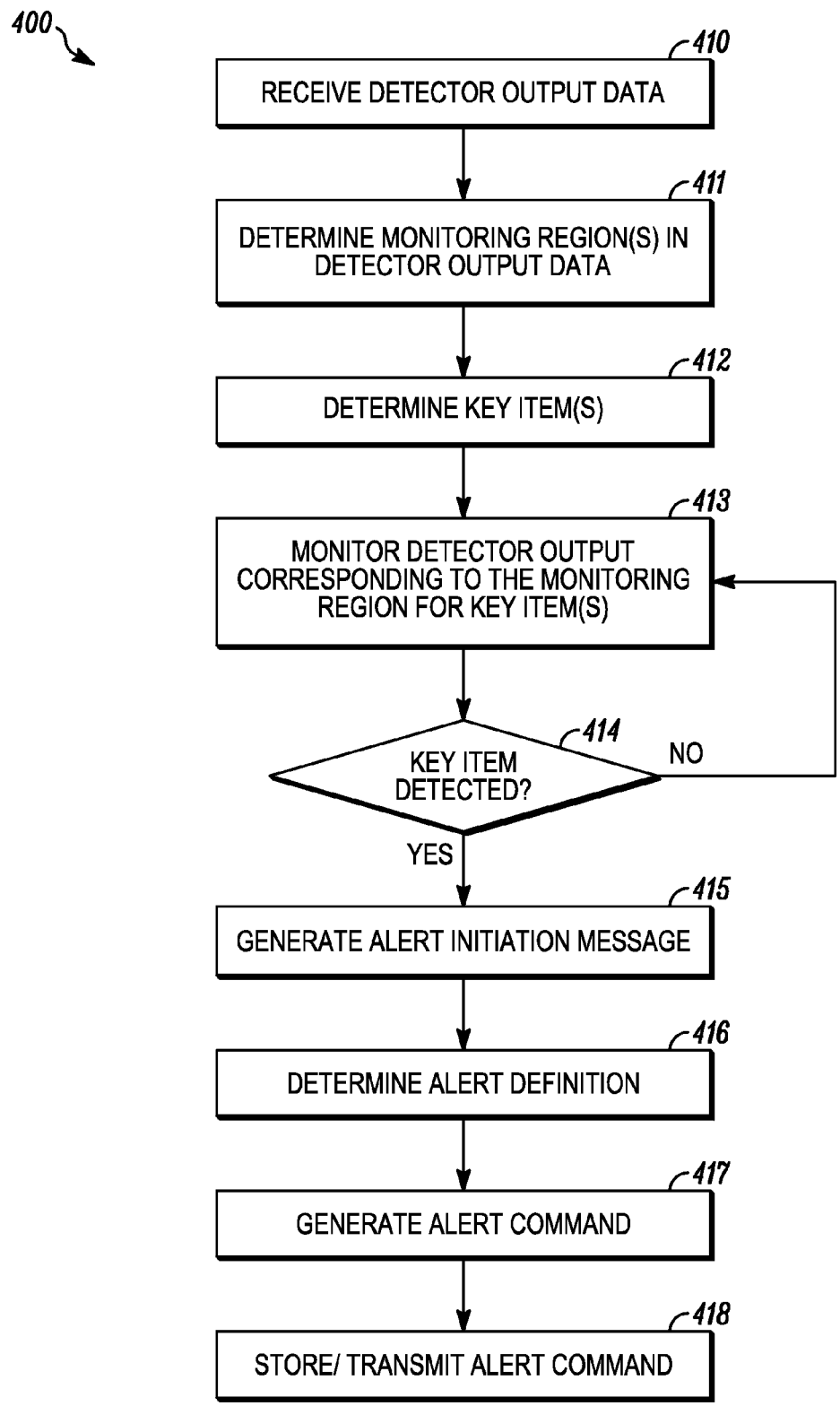
FIG. 4 illustrates a flowchart for a method for generating alerts based on and using on-screen data, according to embodiments of the present disclosure.
Figure 5:
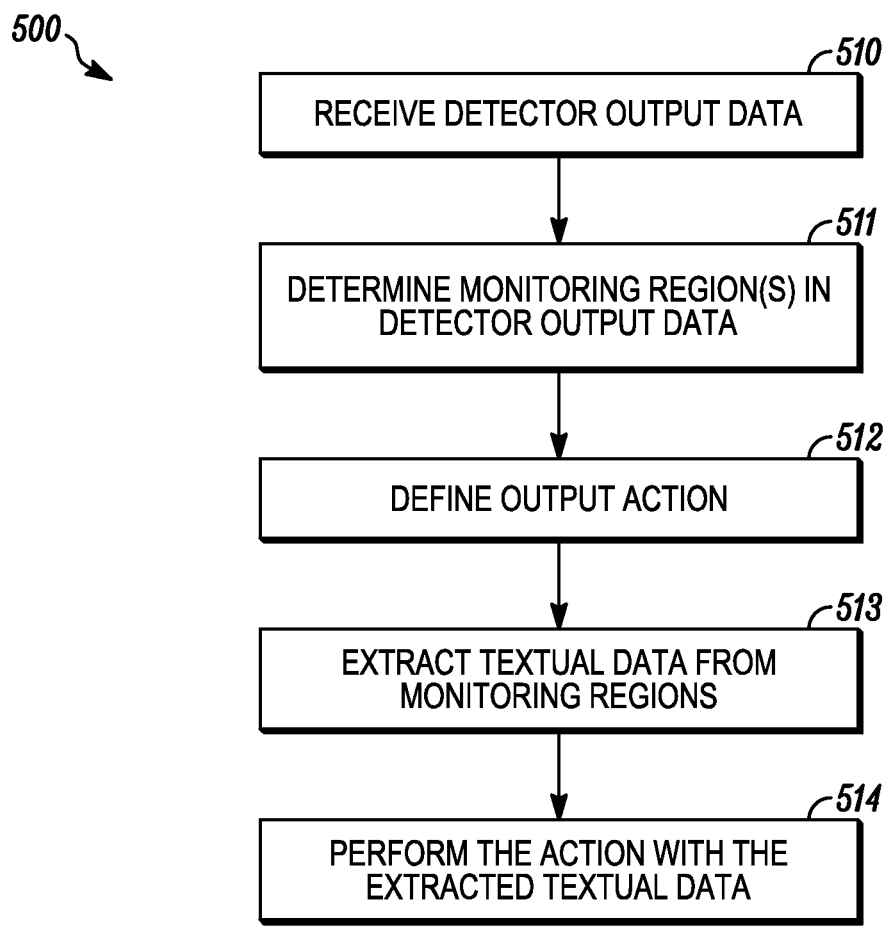
FIG. 5 illustrates a flowchart for a method for performing action using on-screen data, according to embodiments of the present disclosure.

To further illustrate the functionality and possible actions that the alert engine 125 can perform while monitoring regions, methods for generating alerts and extracting on-screen text are described in reference to FIGS. 4 and 5.

On-Screen Text Alerts

FIG. 4 illustrates a flowchart of a method 400 for generating alerts based on the detection of specific triggering key items in one or more monitoring regions of the visual content of video data 141. Method 400 can begin at box 410 in which the alert engine 125 can receive the detector output data 147 from the video analyzer 111. In embodiments, the detector output data 147 is received before, after, or in parallel to receiving corresponding video data 141. In another embodiment, the detector output data 147 is received with or embedded in the corresponding video data 141. As described herein, the detector output data 147 can include component data resulting from the analysis of the video data 141. For example, the detector output data 147 can include correlated visual data, audio data, and/or textual data. Each component of the detector output data 147 can include an association with one or more regions, frames, or video assets in the video data 141. Accordingly, visual data and textual data in the detector output data 147 can include or be associated with region data 149 that defines the regions of pixels within the frames of the video data 141 in which the corresponding on-screen text or object is located.

At box 411, the alert engine 125 can determine one or more regions in the detector output data 147 to monitor. The alert engine 125 can use the region data 149 or the output detector data 147 to define specific areas in the frames of a particular video asset that user 107 can select. In one embodiment, user interface engine 121, in response to commands received from the alert engine 125, can render a user interface through which a user can select a region in the visual video content to monitor. For example, the user interface engine 121, based on the region data, can render a user interface with highlights or boxed regions that are selectable using a user interface device 121 (e.g., a mouse, control, etc.). Based on user input, the alert engine 125 can designate the selected regions as the monitoring regions.

Once the monitoring regions are determined, the alert engine 125 can determine key items to monitor for in each of the corresponding monitoring regions, at box 412. As described herein, the key items can include pixel patterns or images corresponding to on-screen text or on-screen objects in the visual data, as well as computer readable text strings.

In one embodiment, the user interface engine 121 can generate a GUI to allow a user to select on-screen text from one of the corresponding regions in a particular frame of video content based on the detector output data 147. While the client device 120 is displaying frames for a particular video data 141, the user interface engine 121 can render a user interface superimposed over the visual video content indicating selectable regions and/or selectable on-screen text that can be used as a key item. In such embodiments, in response to user input that indicates a selection of specific on-screen text, the alert engine 125 can retrieve the corresponding textual data from the detector output data 147 to be used as the key item.

In one embodiment, a user may select an image of an object or an image of text in the visual video content. The alert engine 125 can determine a particular pixel pattern in the image of the object or text and use that particular pixel pattern as the key item. Accordingly, is such embodiment, the key item can include the particular pixel pattern.

In other embodiments, the user interface engine 121 can render a text input field or receive voice commands to accept user input for a text string that can be used as the key item.

Once the monitoring regions and the key items are defined, the alert engine 125 can monitor the detector output data 147 for the selected monitoring regions as the corresponding video content is played by the client device 120. In one embodiment, monitoring the regions can include comparing the detector output data 147 for the monitoring regions of each frame in the video data 141 against corresponding key items.

The detector output data 147 can be generated before the monitoring of the monitoring regions begins. In such embodiment, the previously generated detector data 147 can be stored for later retrieval when the video data 141 corresponding to the video content is accessed for playback. However, it is also possible for the detector output data to be determined contemporaneously, or at least nearly so, with the monitoring of the monitoring regions.

In either of such embodiments, the key items can include trigger images, characters, words, or phrases. The comparison of the detector output data 147 against the key items can be performed at the pixel level. In such embodiments, the particular pixel pattern of the key item can be compared against the pixel data extracted from the monitoring region itself or the corresponding visual data of the detector output data 147. In other embodiments, in which the key item is a text string, textual data in the detector output data 147, resulting from character recognition operations performed on the corresponding visual data, can be compared against the text string.

In some embodiments, the comparison of the monitoring region against the key item is performed on a frame-by-frame basis. Accordingly, at determination 414, if no match is detected in a particular frame of the video data 141, then the alert engine 125 can continue to monitor the monitoring regions at block 413. However, if in determination 414, the alert engine 125 detects a match, it can trigger an alert at box 415. In one embodiment, triggering an alert can include generating an alert initiation message. The alert initiation message can include the detected key item. In some embodiments, the alert initiation message can also include information regarding the specific requesting user 107 and/or the specific client device 120.

At box 416, the alert engine 105 can determine an alert definition based on the alert initiation message. In one embodiment, determining the alert definition can include accessing the alert database 130 to retrieve an alert definition 153 corresponding to the specifics defined in the alert initiation message. Accordingly, the alert definition 153 can be associated with a particular user 108, key item, and/or client device 120.

As described herein, the alert definition 153 can include specifications for the type and style of the alert. In particular, the alert definition 153 can include specifications regarding the visual content of the alert, audio content of the alert, and the location within the frame in which the alert should be rendered. For example, the alert definition 153 can include computer executable code that the alert engine 125 or user interface engine 121 can use to render the specific alert. In some embodiments, the alert definition 153 can also specify over which video data 141 the alert should be rendered. For example, the alert can be rendered as a visual alert superimposed over the visual content of the video asset in which the monitoring regions are defined, or over the visual content of another video asset, so that a user can receive alerts for the content of one program while watching another.

At box 417, the alert engine 125 can generate an alert command 155 that includes computer executable instructions that the user interface engine 121 and/or client device 120 can use to generate the actual alert to the user in accordance with the alert definition 153. Accordingly, the alert command 155 can include the alert definition 156 and/or the triggering key item. At box 418, the alert engine 125 can store the alert command 155 or transmit the alert command 155 to one or more client devices 120. In embodiments in which the alert engine 125 stores the alert command, the alert command can be associated with the detector output data 147 so that it can be referenced for later playback. In embodiments in which the alert engine transmits the alert command to a particular client device 120, the corresponding user interface engine 121 can execute the alert command to generate and/or render the corresponding alert.

On-Screen Text Based Supplemental Information

FIG. 5 is a flowchart illustrating method 500 for performing various actions in response to monitoring on-screen text in one or more monitoring regions, according to embodiments of the present disclosure. Method 500 can begin at action 510 in which the alert engine 125 can receive the detector output data 147 from the video analyzer 111. At box 511, the alert engine 125 can determine one or more monitoring regions in the detector output data 147 to monitor in parallel to the playback of the corresponding video data 141. Determining the monitoring regions can be in response to user input received through the user interface engine 121 or based on metadata regarding the video data 141.

Once the monitoring regions are determined, the alert engine can define an output action, at block 512. Defining the output action can be based on user input received through the user interface engine 121. For example, the user interface engine can present the user with a number of options or menu items from which they can customize the resulting action. In some embodiments, options for resulting action can be based on a predetermined alert definition 153 stored in the alert datastore 130. For example, the alert definition can specify that the action include extracting the textual data from the detector output data 147 corresponding to the monitoring regions from one or more frames of the video data 141. For example, the action may include extracting the scrolling text from the monitoring region of one channel and rendering it over the video content on another channel. In one embodiment, the on-screen text for a particular monitoring region can be extracted from the detector output data 147 and recorded to generate a historical summary 340 of the video data 141, as illustrated in FIG. 3F.

The definition of the output action can also include augmenting the historical summary 340 so that the listings 341 of on-screen text can be saved and correlated to user interface elements that can be used to navigate to specific points within the video data that include specific on-screen text. In other embodiments, the textual data corresponding to the on-screen text in the monitoring regions can be sent to one or more remote computers, such as a social networking server computer, to report trending topics within the video data 141. This information can be correlated with information or identification of the user 107 to report various social analysis of the on-screen text.

Once the output action is defined, the alert engine 125 can extract the text data from the detector output data 147 corresponding to the monitoring regions for the various frames of the video data 141, at block 513. At block 514, the alert engine 125 can then perform the defined output action using the extracted textual data.

In another embodiment, the action can include comparing changes of the textual data in the frames of the video data 141 displayed in one channel and momentarily displaying the new on-screen text in another channel. For example, a user may set the monitoring region of a sporting event over the area of the screen in which the score is usually displayed. Whenever the score changes, the alert engine 125 can extract the new score and momentarily render it over the visual content of another video asset.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computer system, video data comprising a plurality of frames, wherein each frame comprises a plurality of pixels;
   determining, by the computer system, a monitoring region in the plurality of frames, wherein the monitoring region comprises a subset of the plurality of pixels, by associating the subset of the plurality of pixels with a key item comprising a particular pixel pattern;
   extracting, by the computer system, pixel data from the subset of the plurality of pixels in the monitoring region in a subset of the plurality of frames;
   analyzing, by the computer system, the extracted pixel data from the monitoring region; and
   performing, by the computer system, an action based on the analyzing.

2. The method of claim 1, wherein the analyzing the extracted pixel data comprises:
   defining, by the computer system, the key item comprising a particular pixel pattern;
   comparing, by the computer system, the pixel data to the particular pixel pattern; and
   determining, by the computer system, a match based on the comparing of the pixel data to the particular pixel pattern.

3. The method of claim 2, wherein the key item comprises a text string, and wherein the particular pixel pattern comprises rendered text corresponding to the text string.

4. The method of claim 3, wherein the comparing the pixel data to the particular pattern comprises:
   performing, by the computer system, a character recognition operation on the pixel data to generate textual data; and
   comparing, by the computer system, the textual data to the text string.

5. The method of claim 2, wherein the performing the action comprises generating, by the computer system, an alert that the key item has been detected.

6. The method of claim 5, wherein the generating the alert comprises:
   generating, by the computer system, an alert message; and
   embedding, by the computer system, the alert message in other video data.

7. The method of claim 6, wherein extracting the pixel data comprises performing, by the computer system, a character recognition operation on the pixel data to generate textual data, and wherein the alert message comprises the textual data.

8. The method of claim 5, wherein the video data comprises an audio component, and wherein the generating the alert comprises changing, by the computer system, a volume setting associated with the audio component during playback of the video data.

9. The method of claim 2, wherein the particular pixel pattern comprises an image of an object or a person.

10. The method of claim 2, wherein the performing the action comprises associating the subset of the plurality of frames with the key item.

11. The method of claim 1, wherein the performing the action comprises rendering, by the computer system, the subset of the plurality of frames on a display device coupled to the computer system according to a predetermined order.

12. The method of claim 1, wherein the analyzing the extracted pixel data comprises performing, by the computer system, a character recognition operation on the pixel data to generate textual data.

13. The method of claim 12, wherein the performing the action comprises embedding, by the computer system, the textual data into other video data, wherein the textual data can be rendered in superimposition over images rendered from the other video data.

14. The method of claim 12, wherein the plurality of frames are arranged according to ordered positions, and wherein the method further comprises rendering, by the computer system, text, based on the textual data, in superimposition over pixels of the subset of the plurality of frames according to the ordered positions.

15. The method of claim 14, further comprising:
extracting, by the computer system, additional pixel data from the subset of the plurality of pixels in the monitoring region in another subset of the plurality of frames;
performing, by the computer system, a character recognition operation on the additional pixel data to generate additional textual data; and
rendering, by the computer system, additional text, based on the additional textual data, in superimposition over pixels of the subset of the plurality of frames according to the ordered positions.

16. The method of claim 15 wherein the other subset of the plurality of frames is associated with a first subset of the ordered positions different from a second subset of the ordered positions associated with the subset of the plurality of frames.

17. The method of claim 14, wherein the text comprises controls for navigating to one or more of the frames in the plurality of frames.

18. A method comprising:
receiving, by a computer system, video data comprising a plurality of frames;
receiving, by the computer system, previously determined detector output data corresponding to the video data, wherein the previously determined detector output data comprises textual data corresponding to images of text detected in corresponding regions of the plurality of frames;
determining, by the computer system, a monitoring region in the plurality of frames, wherein the monitoring region comprises at least one of the regions in the plurality of frames, by associating the at least one of the regions in the plurality of frames with a key item comprising a particular pixel pattern;
defining, by the computer system, a text string; and
for each frame in the plurality of frames:
determining, by the computer system, the textual data from the previously determined detector output data for the monitoring region;
comparing, by the computer system, the textual data with the text string;
determining, by the computer system, a match based on the comparing; and
performing, by the computer system, one or more actions in response to the match.

19. The method of claim 18, wherein at least one of the one or more actions comprises generating an alert message.

20. An apparatus comprising:
one or more computer processors; and
a non-transitory computer-readable storage medium comprising instructions that when executed control the one or more computer processors to be configured to:
receive video data comprising a plurality of frames, wherein each frame comprises a plurality of pixels;
determine a monitoring region in the plurality of frames, wherein the monitoring region comprises a subset of the plurality of pixels by associating the at least one of the regions in the plurality of frames with a key item comprising a particular pixel pattern;
extract pixel data from the subset of the plurality of pixels in the monitoring region in a subset of the plurality of frames;
analyze the extracted pixel data from the monitoring region; and
perform an action based on the analysis.

\* \* \* \* \*